United States Patent
Benz et al.

(10) Patent No.: US 7,068,629 B1
(45) Date of Patent: Jun. 27, 2006

(54) METHOD AND RADIO COMMUNICATION SYSTEM FOR SYNCHRONIZING SUBSCRIBER STATIONS

(75) Inventors: Michael Benz, Berlin (DE); Anja Klein, Berlin (DE); Armin Sitte, Berlin (DE); Thomas Ulrich, Berlin (DE); Michael Faerber, Wolfratshausen (DE); Meik Kottkamp, Berlin (DE); Volker Sommer, Berlin (DE)

(73) Assignee: Siemens Aktiengesellschaft, Munich (DE)

( * ) Notice: Subject to any disclaimer, the term of this patent is extended or adjusted under 35 U.S.C. 154(b) by 0 days.

(21) Appl. No.: 09/786,608

(22) PCT Filed: Sep. 3, 1999

(86) PCT No.: PCT/DE99/02805

§ 371 (c)(1),
(2), (4) Date: Jun. 29, 2001

(87) PCT Pub. No.: WO00/14904

PCT Pub. Date: Mar. 16, 2000

(30) Foreign Application Priority Data

Sep. 3, 1998 (DE) .................. 198 40 232

(51) Int. Cl.
*H04B 7/216* (2006.01)
(52) U.S. Cl. .................. 370/335; 370/342; 370/514; 375/145
(58) Field of Classification Search ........ 370/503–504, 370/515, 335, 342, 508, 509; 375/130, 140, 375/145
See application file for complete search history.

(56) References Cited

U.S. PATENT DOCUMENTS 5,991,330 A * 11/1999 Dahlman et al. .......... 375/149

(Continued)

FOREIGN PATENT DOCUMENTS

DE 198 27 700 C1 5/2000

(Continued)

OTHER PUBLICATIONS

TR 101 146 V3.0.0 (Dec. 1997) Technical Report—Universal Mobile Telecommunications Systems (UMTS); UMTS Terrestrial Radio Access (UTRA); Concept evaluation (UMTS 30.06 version 3.0.0).

(Continued)

*Primary Examiner*—Ricky Ngo
*Assistant Examiner*—Nittaya Juntima
(74) *Attorney, Agent, or Firm*—Bell, Boyd & Lloyd, LLC

(57) ABSTRACT

A method and radio communication system for synchronizing subscriber stations, wherein a time slot is assigned to a number of base stations for transmitting at least one synchronization sequence and adjacent base stations use a different time offset with respect to the beginning of the time slot for transmitting the synchronization sequence. Thus, superposition can be precluded even in the case of a synchronized operation of the base stations. So that the subscriber station can still determine the beginning of the time slot, the time offset is transmitted. The time offset corresponds to the choice of one or more synchronization sequences and/or the sequence of a number of synchronization sequences. The information relating to the time offset is transmitted coded in this manner. A subscriber station receives the synchronization sequence and performs a time synchronization via the time of reception of the synchronization sequence and the detected synchronization sequence designating the time offset and/or the detected sequence of a number of synchronization sequences.

13 Claims, 4 Drawing Sheets

U.S. PATENT DOCUMENTS 6,157,631 A * 12/2000 Rohani ........................ 370/342
6,526,091 B1 * 2/2003 Nystrom et al. ............ 375/142
6,603,735 B1 * 8/2003 Park et al. ................... 370/208

FOREIGN PATENT DOCUMENTS

| EP | 0 795 971 A2 | 9/1997 |
|---|---|---|
| WO | WO 94/30024 | 12/1994 |
| WO | WO 98/59443 | 12/1998 |

OTHER PUBLICATIONS

XP-000784828—UMTS/IMT 2000 Based on Wideband CDMA, Dahlman et al., pp. 70-80.

SMG2 UMTS Physical Layer Expert Group—ULTA Physical Layer Description FDD parts (v0.4, Jun. 25, 1998).

* cited by examiner

METHOD AND RADIO COMMUNICATION SYSTEM FOR SYNCHRONIZING SUBSCRIBER STATIONS

BACKGROUND OF THE INVENTION

1. Field of the Invention

The present invention relates to a method and a radio communication system for synchronizing subscriber stations, particularly to the synchronization within a mobile radio system which includes broadband channels and TDD and CDMA subscriber separation.

2. Description of the Prior Art

In radio communication systems, messages (for example, voice, video information or other data) are transmitted via an air interface with the aid of electromagnetic waves. The air interface relates to a connection between a base station and subscriber stations, where the subscriber stations can be mobile stations or stationary radio stations. The electromagnetic waves are radiated with carrier frequencies which are in the frequency band provided for the respective system. For future radio communication systems, for example the Universal Mobile Telecommunication System (UMTS) or other third-generation systems, frequencies within the frequency band of approx. 2000 MHz are provided.

For the third mobile radio generation, two modes are provided; one mode designating an FDD (Frequency Division Duplex) mode, see ETSI STC SMG2 UMTS-L1, Tdoc SMG2 UMTS-L1 221/98, of 25.8.1998, and the other mode designating a TDD (Time Division Duplex) mode, see DE 198 27 700. The operating modes are used in different frequency bands and both use time slots.

In ETSI STC SMG2 UMTS-L1, Tdoc SMG2 UMTS-L1 221/98, of 25.8.1998, a synchronization method which uses synchronization sequences transmitted in every time slot is described in chapters 2.3.3.2.3 and 6.3 for the FDD mode. This makes it possible to synchronize the subscriber stations at the beginning of the time slot. The sequence of transmissions of a second synchronization sequence signals which spread-spectrum code is used by the base station. Furthermore, the beginning of the frame also can be derived therefrom.

However, this synchronization method leads to a scenario as shown in FIG. 1 with a synchronous operation of the base stations. The synchronization sequences of base stations of two radio cells Z1, Z3 are superimposed at the receiving subscriber station since the transmissions of the synchronization sequences of all base stations are referred to at the beginning of a frame; see FIG. 10 in ETSI STC SMG2 UMTS-L1, Tdoc SMG2 UMTS-L1 221/98 of 25.8.1998. The superimposition impairs proper synchronization.

It is, therefore, an object of the present invention to specify a method and a radio communication system via which the synchronization of the subscriber stations is possible without errors even with at least partially synchronized base stations.

SUMMARY OF THE INVENTION

According to the present invention, therefore, a time slot for transmitting at least one synchronization sequence is allocated to a number of base stations, either by a higher-level entity or by own selection. Adjacent base stations use a different time offset with respect to the beginning of the time slot for transmitting the synchronization sequence. This precludes superposition even with a synchronized operation of the base stations.

The time offset is transmitted so that the subscriber station can still determine the beginning of the time slot. The time offset corresponds to the choice of one or more synchronization sequences and/or the sequence of a number of synchronization sequences. In this manner, the information relating to the time offset is transmitted in coded form. A subscriber station receives the synchronization sequence and performs a time synchronization via the time of reception of the synchronization sequence and the detected synchronization sequence designating the time offset and/or the detected sequence of a number of synchronization sequences.

To signal the time offset, many variants of a single synchronization sequence and/or the order of transmission of different synchronization sequences for example, can be used. Advantageously, two synchronization sequences are transmitted in one time slot as in the FDD mode described above. The first synchronization sequence is used for determining the time of reception and for coarse synchronization. The sequence of the second synchronization sequences over a number of transmissions codes the time offset.

According to another embodiment of the present invention, a time interval between the two synchronization sequences in one time slot is predetermined. This provides the possibility of using a single, switchable filter for detecting both synchronization sequences. The second synchronization sequence also can be transmitted before the first one and the time interval is, thus, negative. If two different filters are used, the two sequences also can be transmitted simultaneously.

It is also advantageous to transmit further information by a choice of synchronization sequences and/or their sequence. This provides for quicker operational readiness of the subscriber stations. The further information relates to a frame synchronization, midambles used by the base station, spread-spectrum codes or information on the configuration of a control channel. A high coding gain is achieved if the coding of the further information by choice and/or sequence of the synchronization sequences extends over a number of time slots. If, for example, 17 variants of the second synchronization sequence are used and the sequence of eight transmissions of the second synchronization sequence is evaluated, this provides $17^8$ possibilities. Only a small proportion of these needs to be used.

The synchronization sequences are advantageously unmodulated orthogonal gold codes. As a result, the synchronization method of the FDD mode does not need to be modified much. The synchronization method is particularly suitable for radio communication systems in which the time slots are a part of a TDD transmission arrangement with broadband channels. In this arrangement, a number of time slots per frame can be used for the synchronization. Thus, parts of the detection device can be used for both modes in multi-mode subscriber stations.

To use the fewest possible system resources for broadcasting purposes, the synchronization sequences are sent in time slots in which information of a control channel is additionally transmitted. Thus, only a small number of time slots needs to be continuously kept available in the downlink direction (from the base station to the subscriber station). The degrees of freedom of the asymmetry of both directions of transmission are not much restricted. To keep the interference caused by the synchronization sequences in the remaining channels as low as possible, they are sent at a lower power compared with other transmissions of the base station. This drawback easily can be compensated for by the coding gain.

DETAILED DESCRIPTION OF THE PREFERRED EMBODIMENTS

Figure 2:
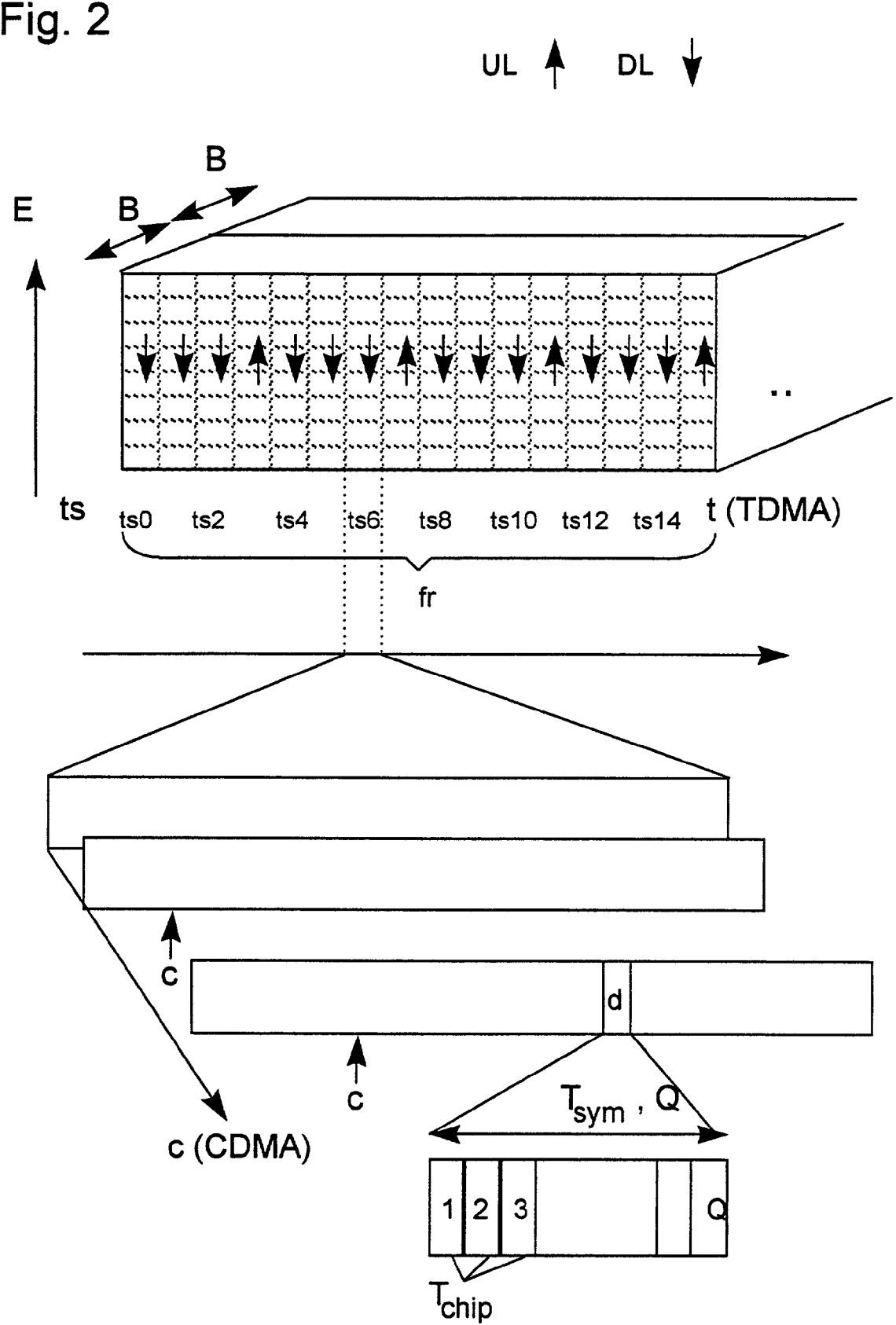
FIG. 2 shows a diagrammatic representation of the air interface between a base station and subscriber stations in a radio communication system of the present invention.

The frame structure of the radio transmission can be seen in FIG. 2. According to a TDMA (Time Division Multiple Access), a broadband frequency band, for example with a bandwidth B=5 MHz, is divided into a number of time slots ts of the same duration, for example 16 time slots ts0 to ts15. A frequency band extends over a frequency range B. Some of the time slots are used in the downlink direction DL and some of the time slots are used in the uplink UL. As an example, an asymmetry ratio of 3:1 in favor of the downlink DL is shown. In this TDD transmission method, the frequency band for the uplink UL corresponds to the frequency band of the downlink DL. The same is repeated for other carrier frequencies. Due to the variable allocation of the time slots ts for the uplink or downlink, a great variety of asymmetric resource allocations can be made.

Within the time slots, the information from a number of connections is transmitted in message blocks. The data d are spread in a connection-oriented manner via a fine structure, a spread-spectrum code c so that at the receiving end, for example n connections can be separated by this CDMA (Code Division Multiple Access) component. The spreading of individual symbols of the data d has the effect that Q chips of duration $T_{chip}$ are transmitted within the symbol period $T_{sym}$. The Q chips here form the connection-oriented spread-spectrum code c.

Within a broadband frequency range B, the successive time slots ts are arranged in accordance with a frame structure. Thus, 16 time slots ts are combined to form one frame fr.

The parameters used for the air interface are advantageously:

| | |
|---|---|
| Chip-rate: | 4.096 Mcps |
| Frame period: | 10 ms |
| Number of time slots: | 16 |
| Duration of a time slot: | 625 µs |
| Spreading factor: | 16 |
| Type of modulation: | QPSK |
| Bandwidth: | 5 MHz |
| Frequency reuse value: | 1 |

These parameters provide for the best possible harmonization with an FDD (Frequency Division Duplex) mode for the 3rd mobile radio generation.

Figure 1:
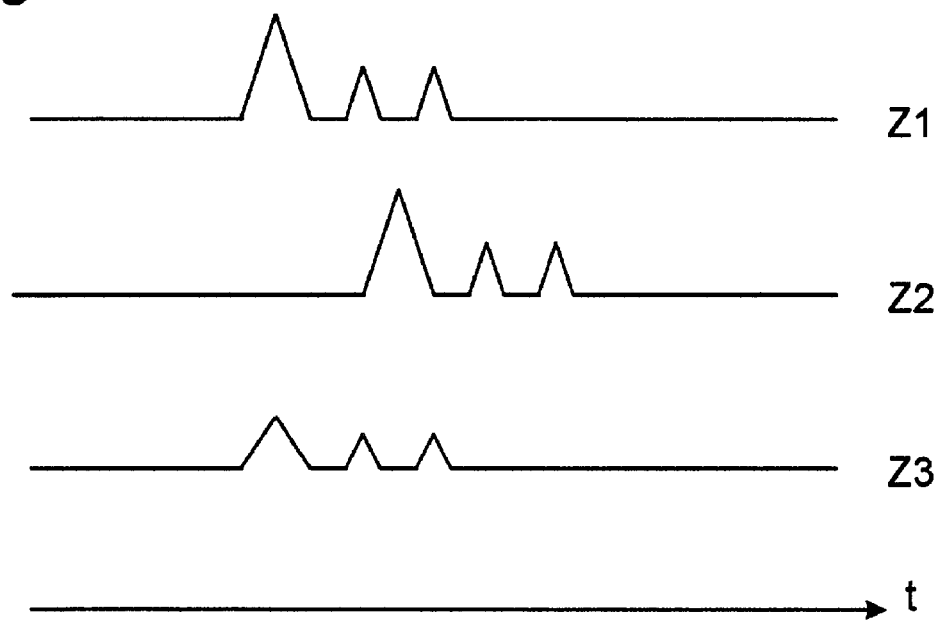
FIG. 1 shows an example of superpositions of synchronization sequences at a receiver in a radio communication system.
Figure 3:
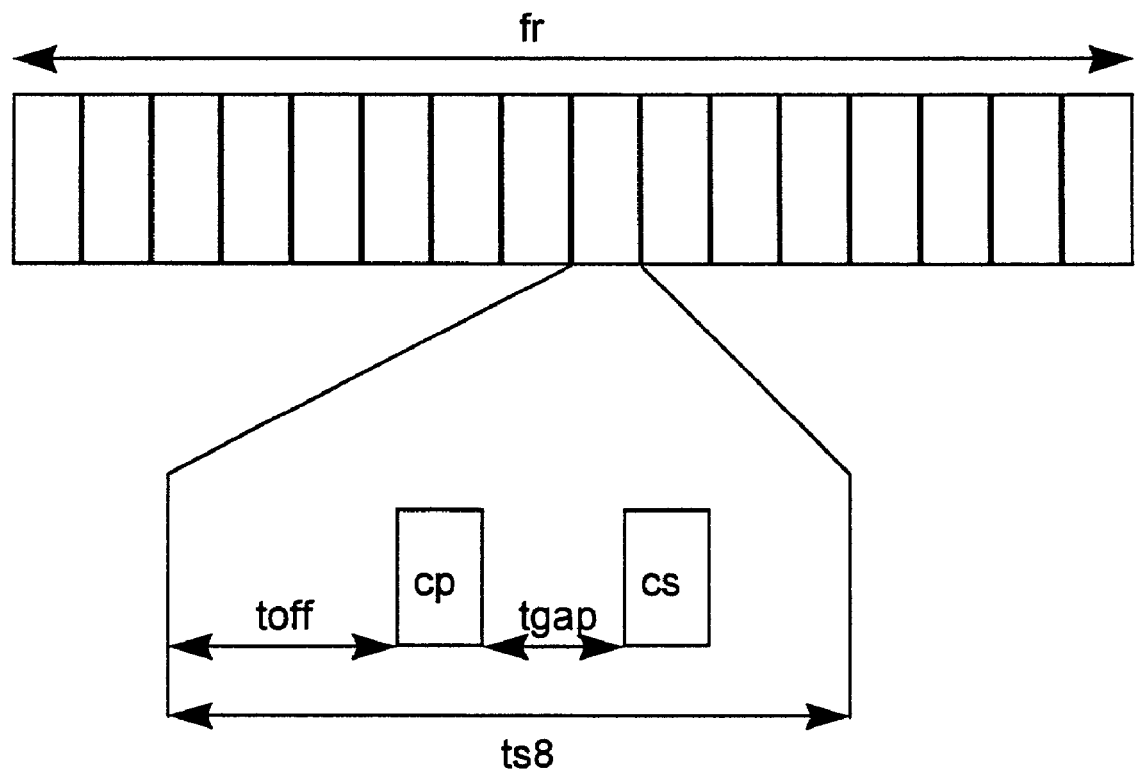
FIG. 3 shows an arrangement for using a time offset in the transmission of the synchronization sequences in accordance with the teachings of the present invention.

In the downlink according to FIG. 3, for example, two time slots ts0, ts8 are used for synchronization. Thus, two synchronization sequences cp, cs separated by a time gap $t_{gap}$ are in each case transmitted in one time slot ts8. The separation of the two synchronization sequences cp, cs has the advantage of reduced interference since the noise power of both sequences is distributed better over time. The first synchronization sequence cp is the same in each time slot ts0, ts8. The second synchronization sequence cs can be chosen individually for each time slot ts0 to time slot ts8.

The choice and order of the second synchronization sequence cs corresponds to a time offset toff by which the transmission of the first synchronization sequence cp is delayed with respect to the beginning of time slot ts8. The receiving subscriber station MS can determine the time offset toff by receiving and evaluating the synchronization sequences cs and take this into consideration during the synchronization.

Adjacent base stations BS are frame-synchronized. According to the present invention, a different time offset toff for transmitting the synchronization sequences is assigned to adjacent base stations BS. For example, 32 different time offsets toff are used so that cell clusters can be formed and when the time offset toff is changed for one base station BS, the whole cluster does not need to be changed.

Due to the choice and sequence of the second synchronization sequences cs over, for example, 4 frames fr and two time slots ts0, ts8 per frame fr, $17^8$ different possibilities for transmitting further information in addition to the time offset toff are created when 17 different unmodulated orthogonal cold codes of 256 chips length are used. Due to the many possibilities, the coding gain is high so that the synchronization sequences cp, cs can be transmitted at low power.

The further information relates to the frame synchronization, midambles used by the base station, spread-spectrum codes (the midambles and spread-spectrum codes being issued independently of one another) and information on the configuration of a control channel BCCH. In the case of two time slots ts per frame fr, used for the synchronization, the beginning of the frame is still inaccurate by a factor of two after detection of the synchronization in one time slot ts. As a result, the frame synchronization can be produced easily by a certain sequence of second synchronization sequences cs. In addition, the later detection of information of the control channel BCCH is speeded up if midambles, spread-spectrum codes and information on the configuration are already transmitted during the synchronization.

In particular, there is the possibility of introducing a scalable control channel BCCH which is announced by the sequence of synchronization sequences cs independently of the use of the time offset toff. According to FIG. 4, for example, control information can be transmitted in one, two or four channels. Thus, the data rate of the control channel BCCH can be adapted to the cell-related requirements in accordance with the services offered there. This provides for future modification of the control channel BCCH. Thus, the parameters (number of channels, time slots and spread-spectrum codes) of the control channel BCCH do not need to be fixed in advance throughout the system but can be transmitted during the synchronization.

Figure 4:
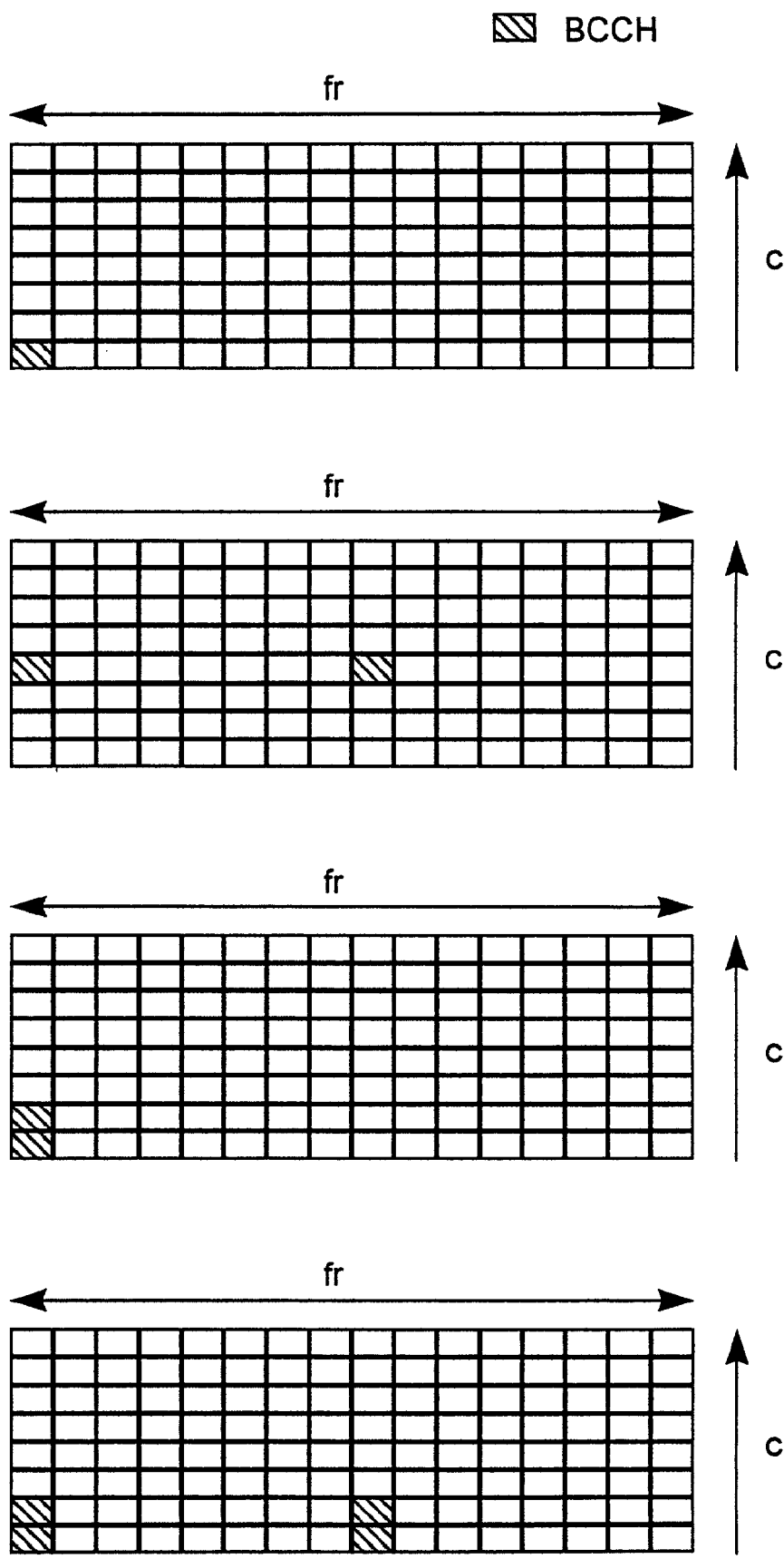
FIG. 4 shows different types of control channels for transmitting control information.

In addition to the variants of FIG. 4, it is also possible to inform about additional channels with control information via the further information from the synchronization. Thus, control information also can be temporarily transmitted in additional channels. The control channel BCCH is transmitted in parallel with other user data calls but possibly with greater error protection coding.

The transmissions of the control channel BCCH and of the synchronization sequences cp, cs are preferably located in the same time slot ts, as a result of which only two time slots ts0, ts8 need to be continuously reserved for the downlink DL. The adjustability of the asymmetry is only restricted very slightly.

If the asymmetry ratios in the system are such that more than two time slots ts0, ts8 are used for the downlink DL, control information also can be transmitted in the remaining time slots ts allocated to the down link DL. It is then also possible to transmit the control information exclusively in time slots ts in which the synchronization sequences cp, cs are not transmitted. The flexibility of the control channel BCCH provides additional advantages since, for example, a distribution over a number of time slots results in greater robustness of the transmission with respect to interference.

Using a multicode transmission in the control channel BCCH (a number of spread-spectrum codes c per time slot ts) within a time slot ts provides for an adaptive increase in the data rate of the control channel BCCH. A similar effect also can be achieved by reducing the spreading factor which also is transmitted via the choice and sequence of the synchronization sequences cs. The choice of time slots ts for transmitting the control information can be coordinated by a higher-level entity; for example, a radio network resource manager RNM for a number of base stations BS.

Figure 5:
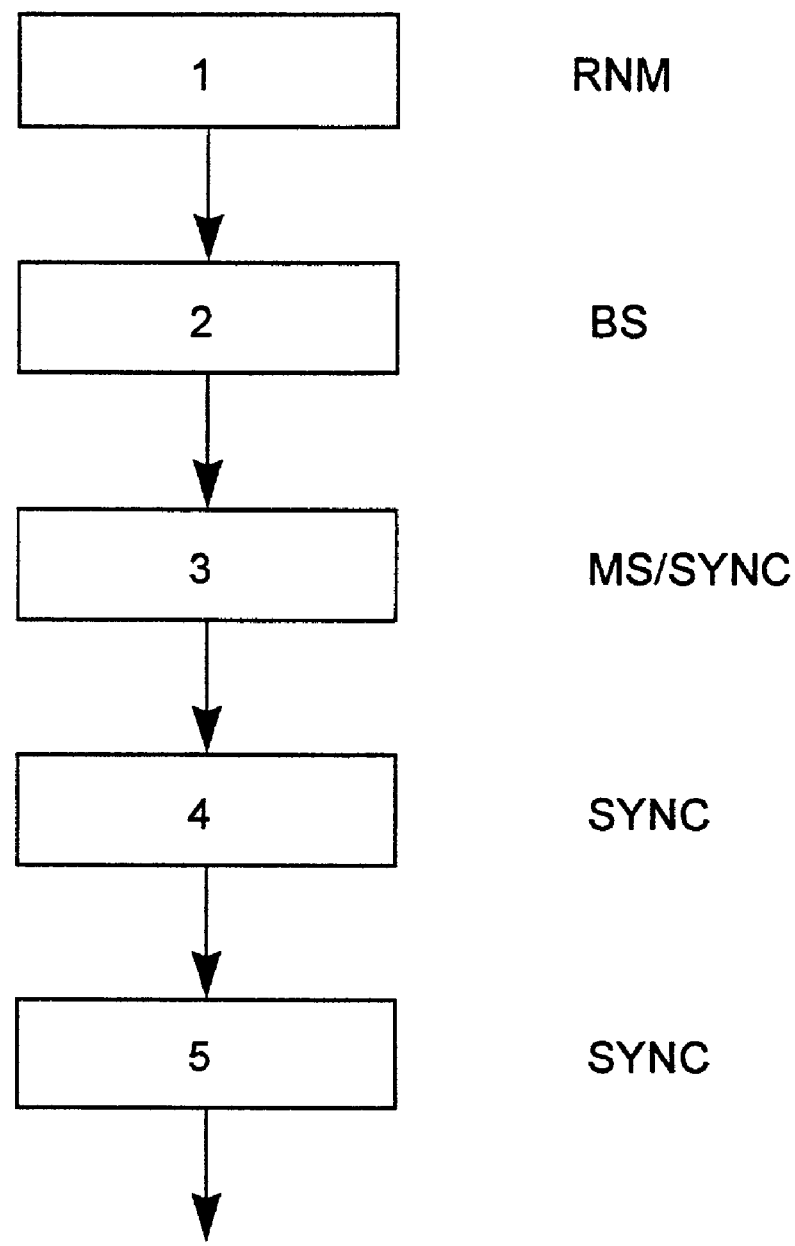
FIG. 5 shows a flow chart for the synchronization of subscriber stations.

The assignment of time slots ts0, ts8 for the synchronization and of different time offsets toff with respect to the beginning of time slot ts0, ts8 for transmitting the synchronization sequences cp, cs, performed in a controller, e.g. the radio network resource manager RNM of a base station system, precedes the synchronization as a first step 1 as shown in FIG. 5. In a second step 2, a number of base stations BS transmit the synchronization sequences cp, cs in the predetermined order which is particular to each base station and corresponds to the time offset toff.

In a third step 3, a subscriber station MS receives the synchronization sequences cp, cs and performs a coarse synchronization via the first synchronization sequence cp. Evaluation of the second synchronization sequences cs in a fourth step 4 enables the time slots to be synchronized to the beginning of time slot ts whereupon, in a fifth step 5, the frame synchronization and the preparation for reception of the control channel BCCH also is performed by evaluating the further information. Steps 3 to 5 are performed by synchronization means SYNC allocated to the subscriber station which, for example, represent a signal processing processor and correlators formed by signal-adapted filters.

Although the present invention has been described with reference to specific embodiments, those of skill in the art will recognize that changes may be made thereto without departing from the spirit and scope of the invention as set forth in the hereafter appended claims.

We claim as our invention:

1. A method for synchronizing subscriber stations in a radio communication system, the method comprising the steps of:

allocating a time slot for transmitting at least one first synchronization sequence to a number of synchronized base stations;

allocating to adjacent base stations a different time offset with respect to a beginning of the time slot for transmitting the at least one first synchronization sequence within a respective time slot, wherein the time offset corresponds to a choice of at least one first synchronization sequence and/or a sequence of a number of second synchronization sequences;

receiving, at a subscriber station, the synchronization sequences; and performing, via the subscriber station, a time synchronization via both a time of reception of the first synchronization sequence and at least one of a detected second synchronization sequence designating the time offset and the detected sequence of the number of second synchronization sequences.

2. A method for synchronizing subscriber stations in a radio communication system as claimed in claim 1, further comprising the step of: transmitting two synchronization sequences in one time slot.

3. A method for synchronizing subscriber stations in a radio communication system as claimed in claim 2, further comprising the step of:

predetermining a time gap between the two synchronization sequences in the one time slot.

4. A method for synchronizing subscriber stations in a radio communication system as claimed in claim 1, the method further comprising the step of:

transmitting further information by the base station by the choice of at least one of the second synchronization sequences and the sequence of second a number of synchronization sequences.

5. A method for synchronizing subscriber stations in a radio communication system as claimed in claim 4, wherein the further information relates to at least one of a frame synchronization, midambles, and spread-spectrum codes used by the base station.

6. A method for synchronizing subscriber stations in a radio communication system as claimed in claim 4, wherein the further information relates to information on the configuration of a control channel.

7. A method for synchronizing subscriber stations in a radio communication system as claimed in claim 6, wherein the information on configuration relates to at least one of a variable number of time slots and spread spectrum codes.

8. A method for synchronizing subscriber stations in a radio communication system as claimed in claim 4, wherein the coding of the further information extends over a number of time slots due to at least one of the choice of second synchronization sequences and the sequence of second synchronization sequences.

9. A method for synchronizing subscriber stations in a radio communication system as claimed in claim 1, wherein the synchronization sequences are unmodulated orthogonal gold codes.

10. A method for synchronizing subscriber stations in a radio communication system as claimed in claim 1, wherein the time slots are a part of a time-division duplex transmission arrangement with broadband channels, a number of time slots per frame being used for the synchronization.

11. A method for synchronizing subscriber stations in a radio communication system as claimed in claim 1, wherein the second synchronization sequences are transmitted in time slots in which information of a control channel is additionally transmitted.

12. A method for synchronizing subscriber stations in a radio communication system as claimed in claim 1, wherein the second synchronization sequences are transmitted at lower power compared with other transmissions of the base station.

13. A radio communication system, comprising:
- a plurality of synchronized base stations for transmitting at least one first synchronization sequence;
- a controller which assigns a time slot and a different time offset with respect to a beginning of the time slot for transmitting the first synchronization sequence to adjacent base stations, the time offset corresponding to a choice of at least one second synchronization sequence and/or a sequence of a number of second synchronization sequences;
- a subscriber station for receiving and evaluating the synchronization sequences; and
- a synchronization part allocated to the subscriber station which performs a time synchronization via a time of reception of the first synchronization sequence and at least one of a detected synchronization sequence designating the time offset and a detected second sequence of a number of second synchronization sequences.

\* \* \* \* \*